(12) United States Patent
Ji et al.

(10) Patent No.: US 10,174,813 B2
(45) Date of Patent: Jan. 8, 2019

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Gyeonggi-do (KR); Seong Wook Hwang, Gyeonggi-do (KR); Woochurl Son, Gyeonggi-do (KR); Hyun Sik Kwon, Seoul (KR); Woo Jin Chang, Gyeonggi-do (KR); Jae Chang Kook, Gyeonggi-do (KR); Wonmin Cho, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 232 days.

(21) Appl. No.: 15/257,967

(22) Filed: Sep. 7, 2016

(65) Prior Publication Data

US 2017/0268613 A1   Sep. 21, 2017

(30) Foreign Application Priority Data

Mar. 16, 2016 (KR) .................. 10-2016-0031672

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ..... F16H 2200/2012; F16H 2200/0069; F16H 2200/2046; F16H 3/66
See application file for complete search history.

(56) References Cited

U.S. PATENT DOCUMENTS

| 8,663,055 B2 | 3/2014 | Brehmer et al. | |
| 2015/0133259 A1* | 5/2015 | Nakamura | F16H 3/66 475/275 |

FOREIGN PATENT DOCUMENTS

| JP | 2015-025519 A | 2/2015 |
| KR | 10-2011-0131816 A | 12/2011 |
| KR | 10-2016-0003494 A | 1/2016 |

* cited by examiner

*Primary Examiner* — Erin D Bishop
(74) *Attorney, Agent, or Firm* — Mintz Levin Cohn Ferris Glovsky and Popeo, P.C.; Peter F. Corless

(57) ABSTRACT

A planetary gear train of a transmission for vehicles is provided. The planetary gear train includes an input shaft that receives power of an engine, an output shaft that outputs power, and four planetary gear sets each including three rotary elements. Additionally, multiple shafts are selectively and directly connected to the rotary elements to thus achieve a shift-stage of at least ten forward speeds or more.

8 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | ● | | ● | | ● | | 6.400 |
| D2 | | | ● | | ● | ● | 3.733 |
| D3 | ● | | ● | | | ● | 2.800 |
| D4 | | | ● | ● | | ● | 2.000 |
| D5 | | ● | ● | | | ● | 1.556 |
| D6 | | ● | | ● | | ● | 1.238 |
| D7 | ● | ● | | ● | | | 1.000 |
| D8 | ● | ● | | | | ● | 0.667 |
| D9 | ● | ● | | | ● | | 0.604 |
| D10 | | ● | | | ● | ● | 0.566 |
| REV | | | ● | ● | ● | | -3.200 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031672 filed in the Korean Intellectual Property Office on Mar. 16, 2016, the entire contents of which are incorporated herein by reference.

BACKGROUND (a) Field of the Invention

The present invention relates to an automatic transmission for vehicles, and more particularly, to a planetary gear train of an automatic transmission for vehicles, which improves a power transmission capability and enhance fuel efficiency by implementing at least ten forward shifts by using a minimum number of components and reduces driving noise of a vehicle using an operating point at a low revolutions per minute (rpm) region of an engine.

(b) Description of the Related Art

In general, in an automatic transmission field, a technology for improving fuel efficiency of a vehicle and maximizing drivability has been researched by increasing the number of shift stages of the transmission. Additionally, recent increase in oil price is a factor causing competition for enhancement of the fuel efficiency. As a result, in the case of an engine, research for reducing a weight and enhancing the fuel efficiency through downsizing has been conducted and in the case of an automatic transmission, research to secure both drivability and fuel efficiency competitiveness through increased shift-stages has been conducted.

However, in the case of the automatic transmission, as the number of shift-stage increases, the number of internal components, in particular, the number of planetary gear sets increases and the whole length of the transmission thus increases. Therefore, mountability and production cost, a weight, and power transmission efficiency may still deteriorate. Accordingly, in the case of the automatic transmission, development of a planetary gear train achieving maximum efficiency with a minimal number of components is important to increase a fuel efficiency enhancement effect through the increased shift-stages of the transmission.

In this aspect, in recent years, the automatic transmission has been configured to implement transmission of eight-speed or more to be mounted on the vehicle and research and development of a planetary gear train capable of implementing a shift-stage of eight speeds or more have also been continuously required. However, most general automatic transmissions of eight speeds or more are constituted by 3 to 4 planetary gear sets and 5 to 6 control elements (friction elements) and thus, the whole length of the system increases, and as a result, the mountability may deteriorate. As a result, to form the shift-stage of the automatic transmission into the multi-stages, in recent years, a double row structure that arranges the planetary gear set on the planetary gear set has been adopted or a dog clutch has been applied instead of a wetting control element, but in this case, an applicable structure is limited and deterioration of a shift quality due to the application of the dog clutch may occur.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a planetary gear train of an automatic transmission for vehicles, which may improve a power transmission capability and enhance fuel efficiency based on a multi-stage shift-stage by implementing a shift-stage of at least 10 forward speeds or more and a shift-stage of at least one reverse speed or more with a minimum number of components and may reduce driving noise of a vehicle using an operating point in a low rpm region of an engine.

An exemplary embodiment of the present invention provides a planetary gear train of an automatic transmission for vehicles that may include: an input shaft configured to receive power of an engine; an output shaft configured to output power; a first planetary gear set including first, second, and third rotary elements; a second planetary gear set including fourth, fifth, and sixth rotary elements; a third planetary gear set including seventh, eighth, and ninth rotary elements; a fourth planetary gear set including tenth, eleventh, and twelfth rotary elements; a first shaft connected to the first rotary element; a second shaft that connects the second rotary element and the sixth rotary element and the twelfth rotary element, and is selectively connected with the first shaft; a third shaft that connects the third rotary element and the seventh rotary element; a fourth shaft connected to the fourth rotary element and directly connected to the input shaft; a fifth shaft connected to the fifth rotary element; a sixth shaft connected to the eighth rotary element and connected to at least one of the fourth shaft and the fifth shaft; a seventh shaft that connects the ninth rotary element and the eleventh rotary element and is directly connected to the output shaft; and an eighth shaft connected to the tenth rotary element and selectively connected to the second shaft.

Further, the first shaft and the fifth shaft may be selectively connected to a transmission housing, respectively. In addition, the first, second, and third rotary elements of the first planetary gear set may be a first sun gear, a first planetary carrier, and a first ring gear, respectively, the fourth, fifth, and sixth rotary elements of the second planetary gear set may be a second sun gear, a second planetary carrier, and a second ring gear, respectively, the seventh, eighth, and ninth rotary elements of the third planetary gear set may be a third sun gear, a third planetary carrier, and a third ring gear, respectively, and the tenth, eleventh, and twelfth rotary elements of the fourth planetary gear set may be a fourth sun gear, a fourth planetary carrier, and a fourth ring gear, respectively.

Moreover, the planetary gear train may include: a first clutch that selectively connects the first shaft and the second shaft; a second clutch that selectively connects the fourth shaft and the sixth shaft; a third clutch that selectively connects the fifth shaft and the sixth shaft; a fourth clutch that selectively connects the second shaft and the eighth shaft; a first brake that selectively connects the fifth shaft and the transmission housing; and a second brake that selectively connects the first shaft and the transmission housing. According to an exemplary embodiment of the present invention, four planetary gear sets constituted by simple planetary gear sets may be combined by 6 control elements to implement a shift-stage of at least ten forward speeds or more and a shift-stage of at least one reverse speed or more.

According to the exemplary embodiment of the present invention, a shift-stage suitable for an rpm of an engine may be implemented by forming the shift-stage of an automatic transmission into multi-stages and in particular, driving noise of a vehicle may be reduced by using an operating point in a low rpm region of the engine. Further, engine operating efficiency may be maximized through high-efficiency multi-stages and a power transmissions capability and fuel efficiency may be improved. Additionally, an effect obtained or predicted by the exemplary embodiment of the present invention is directly or implicitly disclosed in detailed description of the exemplary embodiment of the present invention. In other words, various effects predicted according to the exemplary embodiment of the present invention will be disclosed in the detailed description to be described below.

BRIEF DESCRIPTION OF THE DRAWINGS

The above and other objects, features and other advantages of the present invention will be more clearly understood from the following detailed description when taken in conjunction with the accompanying drawings, in which:

FIG. 2 is an operating table for each shift-stage of a control element applied to the planetary gear train according to an exemplary embodiment of the present invention.

DETAILED DESCRIPTION

Figure 1:
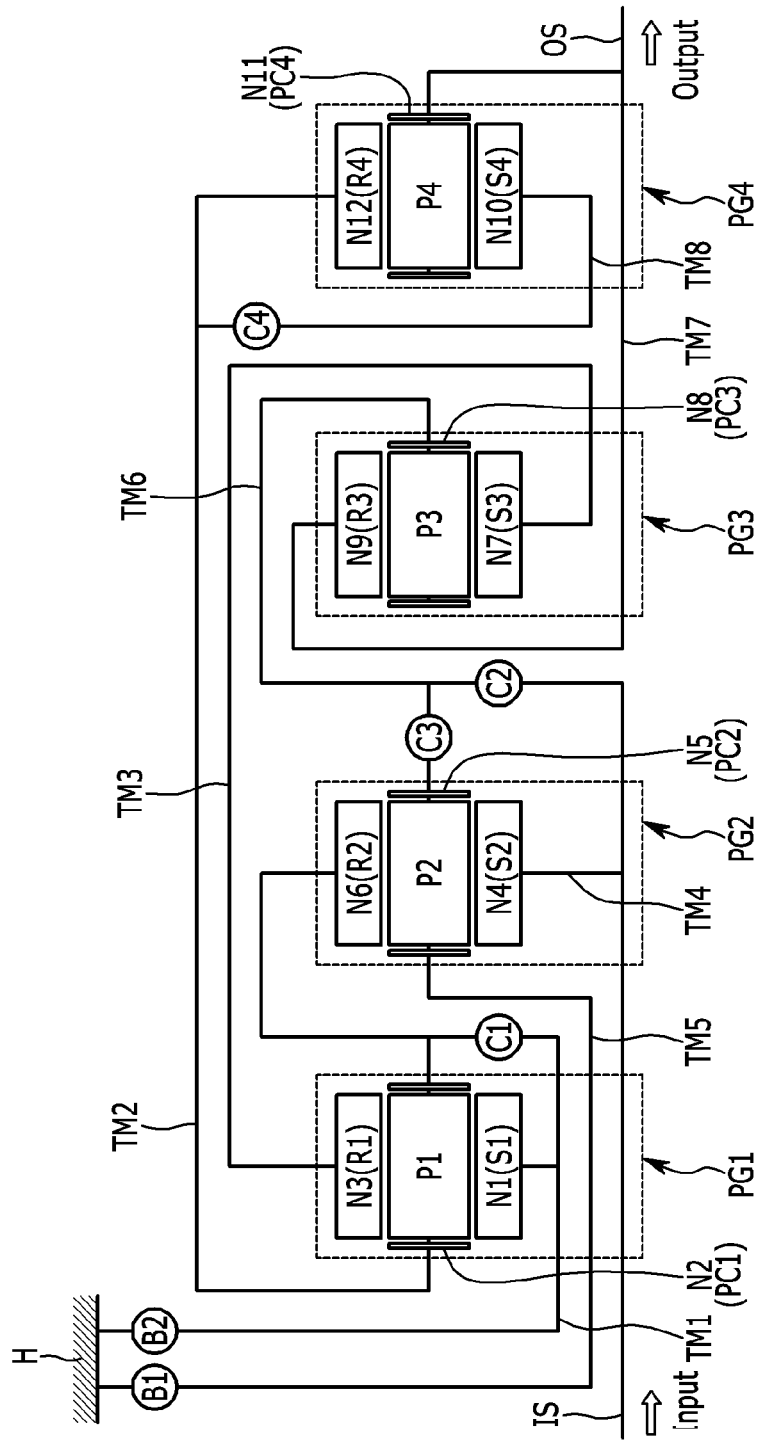
FIG. 1 is a configuration diagram of a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. However, parts not associated with description are omitted for clearly describing the exemplary embodiment of the present invention and like reference numerals designate like elements throughout the specification. In the following description, names of components, which are in the same relationship, are divided into "the first", "the second", and the like to distinguish the components, but the present invention is not limited to the order.

In the disclosure, when two or more members are described to be "fixedly connected", where the member may be any of a shaft, an input shaft, an output shaft, a rotational member, and a transmission housing, it means that the fixedly connected members always rotate at a same speed.

When two or more members are described to be "selectively connected" with each other, it means that the selectively connected members may alter their connection status between "connected" and "disconnected", rotating separately when disconnected, and rotating at a same speed when connected.

FIG. 1 is a configuration diagram of a planetary gear train according to an exemplary embodiment of the present invention. Referring to FIG. 1, the planetary gear train according to the exemplary embodiment of the present invention may include first, second, third, and fourth planetary gear sets PG1, PG2, PG3, and PG4 disposed on the same axial line, an input shaft IS, an output shaft OS, 8 shafts TM1 to TM8 that connect respective rotary elements of the first, second, third, and fourth planetary gear sets PG1, PG2, PG3, and PG4, 4 clutches C1 to C4 and 2 brakes B1 to B2 as control elements, and a transmission housing H.

In addition, rotary power from an engine input from the input shaft IS may be shifted by a complementary operation of the first, second, third, and fourth planetary gear sets PG1, PG2, PG3, and PG4 and output through the output shaft OS. Herein, the respective planetary gear sets may be disposed in the order of the first, second, third, and fourth planetary gear sets PG1, PG2, PG3, and PG4 from the engine side. The input shaft IS may be an input member and torque of the rotary power from a crankshaft of the engine may be converted using a torque converter to be input into the input shaft IS. The output shaft OS as an output member may be disposed on the same axial line as the input shaft IS to transmit shifted drive force to a drive shaft using a differential device.

The first planetary gear set PG1 as a single pinion planetary gear set may include a first sun gear S1 as a first rotary element N1, a first planetary carrier PC1 as a second rotary element N2 that rotatably supports a first pinion gear P1 which externally engages with the first sun gear S1 as the first rotary element N1, and a first ring gear R1 as a third rotary element N3 which internally engages with the first pinion gear P1. The second planetary gear set PG2 as the single pinion planetary gear set may include a second sun gear S2 as a fourth rotary element N4, a second planetary carrier PC2 as a fifth rotary element N5 that rotatably supports a second pinion gear P2 which externally engages with the second sun gear S2 as the fourth rotary element N4, and a second ring gear R2 as a sixth rotary element N6 which internally engages with the second pinion gear P2.

The third planetary gear set PG3 as the single pinion planetary gear set may include a third sun gear S3 as a seventh rotary element N7, a third planetary carrier PC3 as an eighth rotary element N8 that rotatably supports a third pinion gear P3 which externally engages with the third sun gear S3 as the seventh rotary element N7, and a third ring gear R3 as a ninth rotary element N9 which internally engages with the third pinion gear P3. The fourth planetary gear set PG4 as the single pinion planetary gear set may include a fourth sun gear S4 as a tenth rotary element N10, a fourth planetary carrier PC4 as an eleventh rotary element N11 that rotatably supports a fourth pinion gear P4 which externally engages with the fourth sun gear S4 as the tenth rotary element N10, and a fourth ring gear R4 as a twelfth rotary element N12 which internally engages with the fourth pinion gear P4.

Herein, the first, second, third, and fourth planetary gear sets PG1, PG2, PG3, and PG4 may operate while possessing a total of 8 shafts TM1 to TM8 while the second rotary element N2 may be directly connected to the sixth rotary element N6 and the twelfth rotary element N12, the third rotary element N3 may be directly connected to the seventh rotary element N7, and the ninth rotary element N9 may be directly connected to the eleventh rotary element N11. The configuration of 8 shafts TM1 to TM8 will be described below in detail. However, the 8 shafts TM1 to TM8 may be rotary members configured to transmit power while rotating together with the connected rotary elements to directly connect or selectively connect a plurality of rotary elements among the rotary elements of the planetary gear sets PG1, PG2, PG3, and PG4 and fixation members that directly connect and fix the rotary elements to the transmission housing H.

The first shaft TM1 may be connected to the first rotary element N1 (the first sun gear S1) and may operate as a selective fixation element while being selectively connected to the transmission housing H. The second shaft TM2 may directly connect the second rotary element N2 (the first planetary carrier PC1) and the sixth rotary element N6 (the second ring gear R2) and the twelfth rotary element N12 (the fourth ring gear R4) and may be selectively connected with the first shaft TM1. The third shaft TM3 may directly connect the third rotary element N3 (the first ring gear R1) and the seventh rotary element N7 (the third sun gear S3). The fourth shaft TM4 may be connected to the fourth rotary element N4 (the second sun gear S2) and may be directly connected to the input shaft IS to continuously operate as an input element.

The fifth shaft TM5 may be connected to the fifth rotary element N5 (the second planetary carrier PC2) and may operate as the selective fixation element while being selectively connected to the transmission housing H. The sixth shaft TM6 may be connected to the eighth rotary element N8 (the third planetary carrier PC3) and may be selectively connected with the fourth shaft TM4 (alternatively, the input shaft IS) and may be selectively connected with the fifth shaft TM5. In other words, the sixth shaft TM6 may be connected to at least one of the fourth shaft TM4 and the fifth shaft TM5. The seventh shaft TM7 may directly connect the ninth rotary element N9 (the third ring gear R3) and the eleventh rotary element N11 (the fourth planetary carrier PC4) and may be directly connected with the output shaft OS to continuously operate as the output element. The eighth shaft TM8 may be connected to the tenth rotary element N10 (the fourth sun gear S4) and may be selectively connected with the second shaft TM2.

In addition, among the 8 shafts TM1 to TM8, 4 clutches C1, C2, C3, and C4 may be disposed in a part where the shafts are selectively connected, which may include the input shaft IS and the output shaft OS. Further, among the 8 shafts TM1 to TM8, 2 brakes B1 and B2 may be disposed in a part which is selectively connected with the shaft and the transmission housing H. In other words, layout positions of the 4 clutches C1 to C4 and the 2 brakes B1 and B2 will be described below.

The first clutch C1 may be disposed between the first shaft TM1 and the second shaft TM2 to selectively connect the first shaft TM1 and the second shaft TM2 to transmit power. The second clutch C2 may be disposed between the fourth shaft TM4 and the sixth shaft TM6 and may selectively connect the fourth shaft TM4 and the sixth shaft TM6 to transmit the power. The third clutch C3 may be disposed between the fifth shaft TM5 and the sixth shaft TM6 and may selectively connect the fifth shaft TM5 and the sixth shaft TM6 to transmit the power. The fourth clutch C4 may be disposed between the second shaft TM2 and the eighth shaft TM8 and may selectively connect the second shaft TM2 and the eighth shaft TM8 to transmit the power.

The first brake B1 may be disposed between the fifth shaft TM5 and the transmission housing H and may selectively connect and fix the fifth shaft TM5 to the transmission housing H. The second brake B2 may be disposed between the first shaft TM1 and the transmission housing H and may selectively connect and fix the first shaft TM1 to the transmission housing H. Although, the second clutch C2 is described above as selectively connecting the fourth shaft TM4 and the sixth shaft TM6, since the fourth shaft TM4 may be continuously directly connected with the input shaft IS, the second clutch C2 may connect the input shaft IS and the sixth shaft TM6 as illustrated in FIG. 1. Respective control elements constituted by the first, second, third, and fourth clutches C1, C2, C3, and C4 and the first and second brakes B1 and B2 may be configured by a multi-plate type hydraulic friction coupling unit frictionally coupled with each other by oil pressure.

FIG. 2 is an operating table for each shift-stage of a control element applied to the planetary gear train according to an exemplary embodiment of the present invention. Referring to FIG. 2, in the planetary gear train according to the exemplary embodiment of the present invention, while among the first, second, third, and fourth clutches C1, C2, C3, and C4 and the first and second brakes B1 and B2 which are the control elements, three control elements are operated, shifting of one reverse shift and up to forward 10-speed may be performed in each shift-stage and a shifting process is described below.

In a forward first speed D1, the first and third clutches C1 and C3 and the first brake B1 may be operated simultaneously with a gear ratio of about 6.4. As a result, while the first shaft TM1 is connected with the second shaft TM2 by the operation of the first clutch and the fifth shaft TM5 is connected with the sixth shaft TM6 by the operation of the third clutch C3, the rotary power of the input shaft IS may be input into the fourth shaft TM4. In addition, while the first shaft TM5 is operated as the fixation element by the operation of the first brake B1, the shift-stage may be shifted to the forward first speed by the complementary operation of the respective shafts, and as a result, the rotary power may be output through the output shaft OS connected with the seventh shaft TM7.

In a forward second speed D2, the third clutch C3 and the first and second brakes B1 and B2 may be operated simultaneously with a gear ratio of about 3.733. As a result, while the fifth shaft TM5 is connected to the sixth shaft TM6 by the operation of the third clutch C3, the rotary power of the input shaft IS may be input into the fourth shaft TM4. In addition, while the fifth shaft TM5 and the first shaft TM1 are operated as the fixation elements by the operation of the first brake B1 and the second brake B2, the shift-stage may be shifted to the forward second speed by the complementary operation of the respective shafts, and as a result, the rotary power may be output through the output shaft OS connected with the seventh shaft TM7.

In a forward third speed D3, the first and third clutches C1 and C3 and the second brake B2 may be operated simultaneously with a gear ratio of about 2.8. As a result, while the first shaft TM1 is connected with the second shaft TM2 by the operation of the first clutch C1 and the fifth shaft TM5 is connected with the sixth shaft TM6 by the operation of the third clutch C3, the rotary power of the input shaft IS may be input into the fourth shaft TM4. In addition, while the first shaft TM1 is operated as the fixation element by the operation of the second brake B2, the shift-stage may be shifted to the forward third speed by the complementary operation of the respective shafts, and as a result, the rotary power may be output through the output shaft OS connected with the seventh shaft TM7.

In a forward fourth speed D4, the third and fourth clutches C3 and C4 and the second brake B2 may be operated simultaneously with a gear ratio of about 2.0. As a result, while the fifth shaft TM5 is connected with the sixth shaft TM6 by the operation of the third clutch C3 and the second shaft TM2 is connected with the eighth shaft TM8 by the operation of the fourth clutch C4, the rotary power of the input shaft IS may be input into the fourth shaft TM4. In addition, while the first shaft TM1 is operated as the fixation element by the operation of the second brake B2, the shift-stage may be shifted to the forward fourth speed by the complementary operation of the respective shafts, and as a result, the rotary power may be output through the output shaft OS connected with the seventh shaft TM7.

In a forward fifth speed D5, the second and third clutches C2 and C3 and the second brake B2 may be operated simultaneously with a gear ratio of about 1.556. As a result, while the fourth shaft TM4 (alternatively, the input shaft IS) is connected with the sixth shaft TM6 by the operation of the second clutch C2 and the fifth shaft TM5 is connected with the sixth shaft TM6 by the operation of the third clutch C3, the rotary power of the input shaft IS may be input into the fourth shaft TM4. In addition, while the first shaft TM1 is operated as the fixation element by the operation of the second brake B2, the shift-stage may be shifted to the forward fifth speed by the complementary operation of the respective shafts, and as a result, the rotary power may be output through the output shaft OS connected with the seventh shaft TM7.

In a forward sixth speed D6, the second and fourth clutches C2 and C4 and the second brake B2 may be operated simultaneously with a gear ratio of about 1.238. As a result, while the fourth shaft TM4 (alternatively, the input shaft IS) is connected with the sixth shaft TM6 by the operation of the second clutch C2 and the second shaft TM2 is connected with the eighth shaft TM8 by the operation of the fourth clutch C4, the rotary power of the input shaft IS may be input into the fourth shaft TM4. In addition, while the first shaft TM1 is operated as the fixation element by the operation of the second brake B2, the shift-stage may be shifted to the forward sixth speed by the complementary operation of the respective shafts, and as a result, the rotary power may be output through the output shaft OS connected with the seventh shaft TM7.

In a forward seventh speed D7, the first, second, and fourth clutches C1, C2, and C4 may be operated simultaneously with a gear ratio of about 1.0. As a result, while the first shaft TM1 is connected with the second shaft TM2 by the operation of the first clutch C1, the fourth shaft TM4 (alternatively, the input shaft IS) is connected with the sixth shaft TM6 by the operation of the second clutch C2, and the second shaft TM2 is connected with the eighth shaft TM8 by the operation of the fourth clutch C4, the rotary power of the input shaft IS may be input into the fourth shaft TM4. Then, all planetary gear sets PG1, PG2, PG3, and PG4 may be integrated to rotate integrally and the shift-stage may be shifted to the forward seventh speed in which an input is as output (e.g., the input and output are the same), and as a result, the rotary power may be output through the output shaft OS connected with the seventh shaft TM7.

In a forward eighth speed D8, the first and second clutches C1 and C2 and the second brake B2 may be operated simultaneously with a gear ratio of about 0.667. As a result, while the first shaft TM1 is connected with the second shaft TM2 by the operation of the first clutch C1 and the fourth shaft TM4 (alternatively, the input shaft IS) is connected with the sixth shaft TM6 by the operation of the second clutch C2, the rotary power of the input shaft IS may be input into the fourth shaft TM4. In addition, while the first shaft TM1 is operated as the fixation element by the operation of the second brake B2, the shift-stage may be shifted to the forward eighth speed by the complementary operation of the respective shafts, and as a result, the rotary power may be output through the output shaft OS connected with the seventh shaft TM7.

In a forward ninth speed D9, the first and second clutches C1 and C2 and the first brake B1 may be operated simultaneously with a gear ratio of about 0.604. As a result, while the first shaft TM1 is connected with the second shaft TM2 by the operation of the first clutch C1 and the fourth shaft TM4 (alternatively, the input shaft IS) is connected with the sixth shaft TM6 by the operation of the second clutch C2, the rotary power of the input shaft IS may be input into the fourth shaft TM4. In addition, while the fifth shaft TM5 is operated as the fixation element by the operation of the first brake B1, the shift-stage may be shifted to the forward ninth speed by the complementary operation of the respective shafts, and as a result, the rotary power may be output through the output shaft OS connected with the seventh shaft TM7.

In a forward tenth speed D10, the second clutch C2 and the first and second brakes B1 and B2 may be operated simultaneously with a gear ratio of about 0.566. As a result, while the fourth shaft TM4 (alternatively, the input shaft IS) is connected to the sixth shaft TM6 by the operation of the second clutch C2, the rotary power of the input shaft IS may be input into the fourth shaft TM4. In addition, while the fifth shaft TM5 and the first shaft TM1 are operated as the fixation elements by the operation of the first brake B1 and the second brake B2, the shift-stage may be shifted to the forward tenth speed by the complementary operation of the respective shafts, and as a result, the rotary power may be output through the output shaft OS connected with the seventh shaft TM7.

In a reverse speed REV, the third and fourth clutches C3 and C4 and the first brake B1 may be operated simultaneously with a gear ratio of about −3.2. As a result, while the fifth shaft TM5 is connected with the sixth shaft TM6 by the operation of the third clutch C3 and the second shaft TM2 is connected with the eighth shaft TM8 by the operation of the fourth clutch C4, the rotary power of the input shaft IS may be input into the fourth shaft TM4. In addition, while the fifth shaft TM5 is operated as the fixation element by the operation of the first brake B1, the shift-stage may be shifted to the reverse speed by the complementary operation of the respective shafts, and as a result, the rotary power may be reversely output through the output shaft OS connected with the seventh shaft TM7.

In the planetary gear train according to the exemplary embodiment of the present invention, a shift-stage of at least ten forward speeds or more and a shift-stage of at least one reverse speed or more may be achieved by adjusting actuation of 4 clutches C1, C2, C3, and C4 and 2 brakes B1 and B2 in 4 planetary gear sets PG1, PG2, PG3, and PG4. Further, in the planetary gear train according to the exemplary embodiment of the present invention, a shift-stage suitable for an rpm of an engine may be implemented by forming the shift-stage of an automatic transmission into multi-stages and in particular, driving noise of a vehicle may be reduced by using an operating point in a low rpm region of the engine. In addition, according to the exemplary embodiment of the present invention, in the planetary gear train, engine operating efficiency may be maximized through high-efficiency multi-stages of the automatic transmission and a power transmissions capability and fuel efficiency may be improved.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

B1,B2 . . . First, second brake
C1,C2,C3,C4 . . . First, second, third, fourth clutch
PG1,PG2,PG3,PG4 . . . First, second, third, fourth planetary gear set
S1,S2,S3,S4 . . . First, second, third, fourth sun gear
PC1,PC2,PC3,PC4 . . . First, second, third, fourth planetary carrier
R1,R2,R3,R4 . . . First, second, third, fourth ring gear
IS . . . Input shaft
OS . . . Output shaft
TM1,TM2,TM3,TM4,TM5,TM6,TM7,TM8 . . . First, second, third, fourth, fifth, sixth, seventh, eighth shaft

What is claimed is:

1. A planetary gear train of an automatic transmission for vehicles, comprising:
an input shaft configured to receive power of an engine;
an output shaft configured to output power;
a first planetary gear set including first, second, and third rotary elements;
a second planetary gear set including fourth, fifth, and sixth rotary elements;
a third planetary gear set including seventh, eighth, and ninth rotary elements;
a fourth planetary gear set including tenth, eleventh, and twelfth rotary elements;
a first shaft fixedly connected to the first rotary element;
a second shaft that fixedly connects the second rotary element and the sixth rotary element and the twelfth rotary element, and is selectively connected with the first shaft;
a third shaft that fixedly connects the third rotary element and the seventh rotary element;
a fourth shaft fixedly connected to the fourth rotary element and fixedly connected to the input shaft;
a fifth shaft fixedly connected to the fifth rotary element;
a sixth shaft fixedly connected to the eighth rotary element and selectively connected to the fourth shaft and the fifth shaft, respectively;
a seventh shaft that fixedly connects the ninth rotary element and the eleventh rotary element and is fixedly connected to the output shaft; and
an eighth shaft fixedly connected to the tenth rotary element and selectively connected to the second shaft.

2. The planetary gear train of claim 1, wherein the first shaft and the fifth shaft are selectively connected to a transmission housing, respectively.

3. The planetary gear train of claim 2, further comprising:
a first clutch that selectively connects the first shaft and the second shaft;
a second clutch that selectively connects the fourth shaft and the sixth shaft;
a third clutch that selectively connects the fifth shaft and the sixth shaft;
a fourth clutch that selectively connects the second shaft and the eighth shaft;
a first brake that selectively connects the fifth shaft and the transmission housing; and
a second brake that selectively connects the first shaft and the transmission housing.

4. The planetary gear train of claim 1, wherein:
the first, second, and third rotary elements of the first planetary gear set are a first sun gear, a first planetary carrier, and a first ring gear, respectively,
the fourth, fifth, and sixth rotary elements of the second planetary gear set are a second sun gear, a second planetary carrier, and a second ring gear, respectively,
the seventh, eighth, and ninth rotary elements of the third planetary gear set are a third sun gear, a third planetary carrier, and a third ring gear, respectively, and
the tenth, eleventh, and twelfth rotary elements of the fourth planetary gear set are a fourth sun gear, a fourth planetary carrier, and a fourth ring gear, respectively.

5. A planetary gear train of an automatic transmission for vehicles, comprising:
an input shaft configured to receive power of an engine;
an output shaft configured to output power;
a first planetary gear set including first, second, and third rotary elements;
a second planetary gear set including fourth, fifth, and sixth rotary elements;
a third planetary gear set including seventh, eighth, and ninth rotary elements; and
a fourth planetary gear set including tenth, eleventh, and twelfth rotary elements,
wherein the input shaft is fixedly connected with the fourth rotary element,
wherein the output shaft is fixedly connected with the eleventh rotary element,
wherein the first rotary element is selectively connected with the second rotary element,
wherein the second rotary element is fixedly connected with the sixth rotary element and the twelfth rotary element,
wherein the third rotary element is fixedly connected with the seventh rotary element,
wherein the eighth rotary element is selectively connected with at least one of the fourth rotary element and the fifth rotary element,
wherein the ninth rotary element is fixedly connected with the eleventh rotary element, and
wherein the tenth rotary element is selectively connected with the twelfth rotary element.

6. The planetary gear train of claim 5, wherein the first rotary element and the fifth rotary element are selectively connected to a transmission housing, respectively.

7. The planetary gear train of claim 6, further comprising:
a first clutch that selectively connects the first rotary element and the second rotary element;
a second clutch that selectively connects the fourth rotary element and the eighth rotary element;

a third clutch that selectively connects the fifth rotary element and the eighth rotary element;

a fourth clutch that selectively connects the tenth rotary element and the twelfth rotary element;

a first brake that selectively connects the fifth rotary element and the transmission housing; and a second brake that selectively connects the first rotary element and the transmission housing.

8. The planetary gear train of claim 5, wherein:

the first, second, and third rotary elements of the first planetary gear set are a first sun gear, a first planetary carrier, and a first ring gear, respectively, the fourth, fifth, and sixth rotary elements of the second planetary gear set are a second sun gear, a second planetary carrier, and a second ring gear, respectively, the seventh, eighth, and ninth rotary elements of the third planetary gear set are a third sun gear, a third planetary carrier, and a third ring gear, respectively, and the tenth, eleventh, and twelfth rotary elements of the fourth planetary gear set are a fourth sun gear, a fourth planetary carrier, and a fourth ring gear, respectively.

* * * * *